United States Patent Office 3,038,273
Patented June 12, 1962

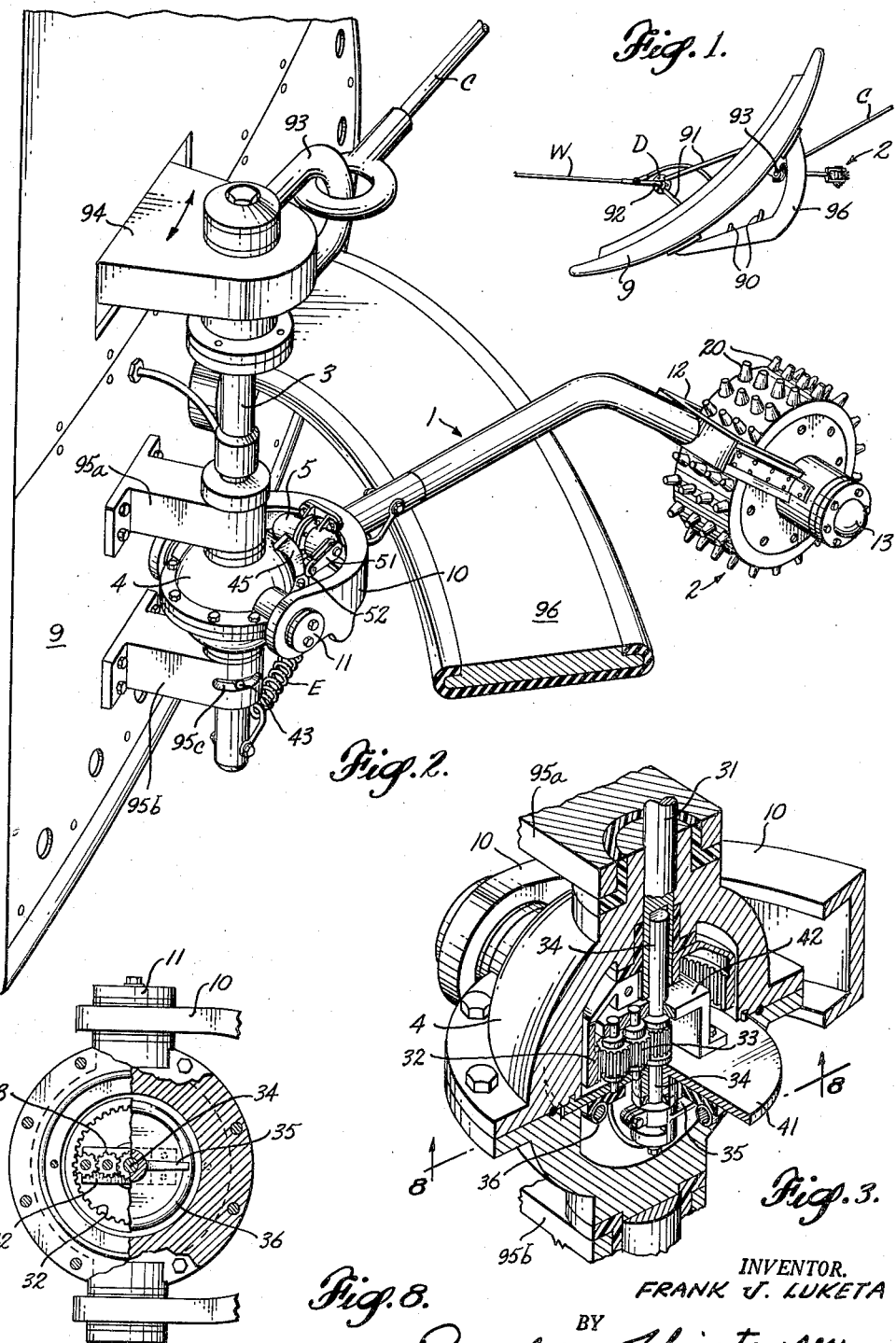

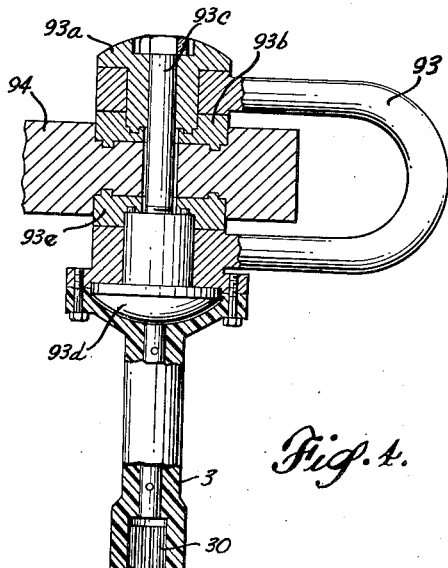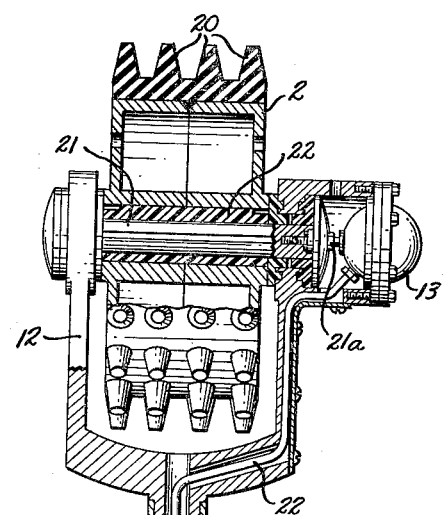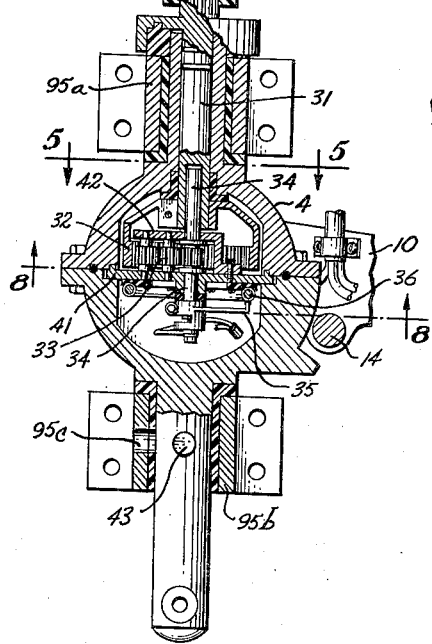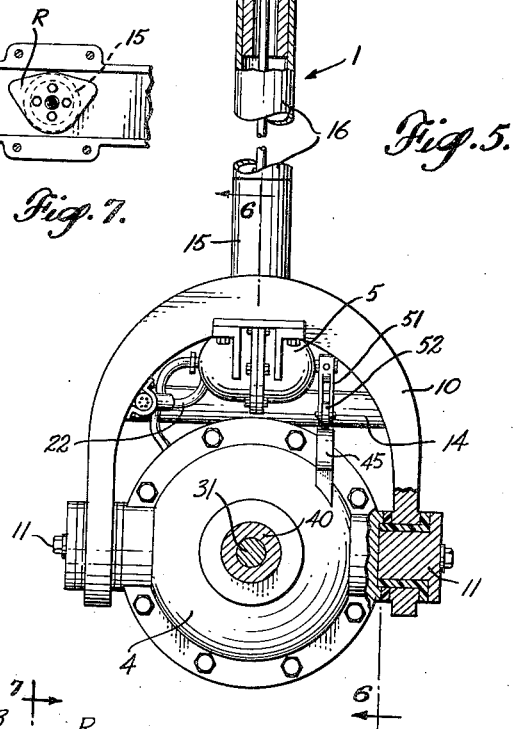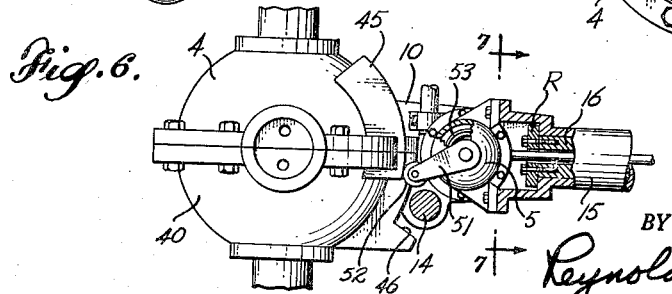
INVENTOR.
FRANK J. LUKETA
BY
Reynolds + Christensen
ATTORNEYS June 12, 1962
F. J. LUKETA
3,038,273
SPREAD, SPEED, DISTANCE, AND ON-BOTTOM SENSER FOR TRAWL NETS
Filed Nov. 28, 1960
4 Sheets-Sheet 3
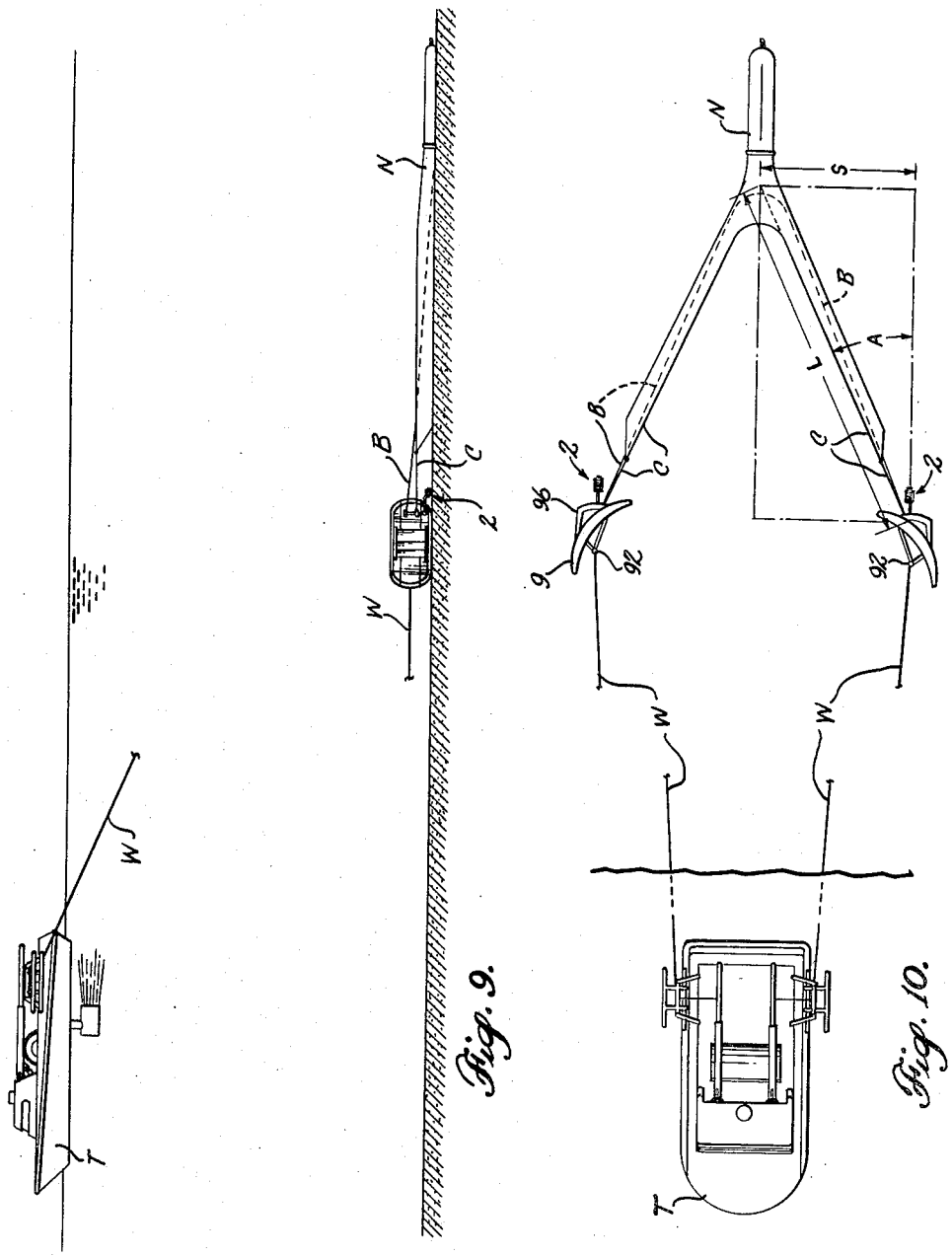
INVENTOR.
FRANK J. LUKETA
BY
Reynolds & Christensen
ATTORNEYS

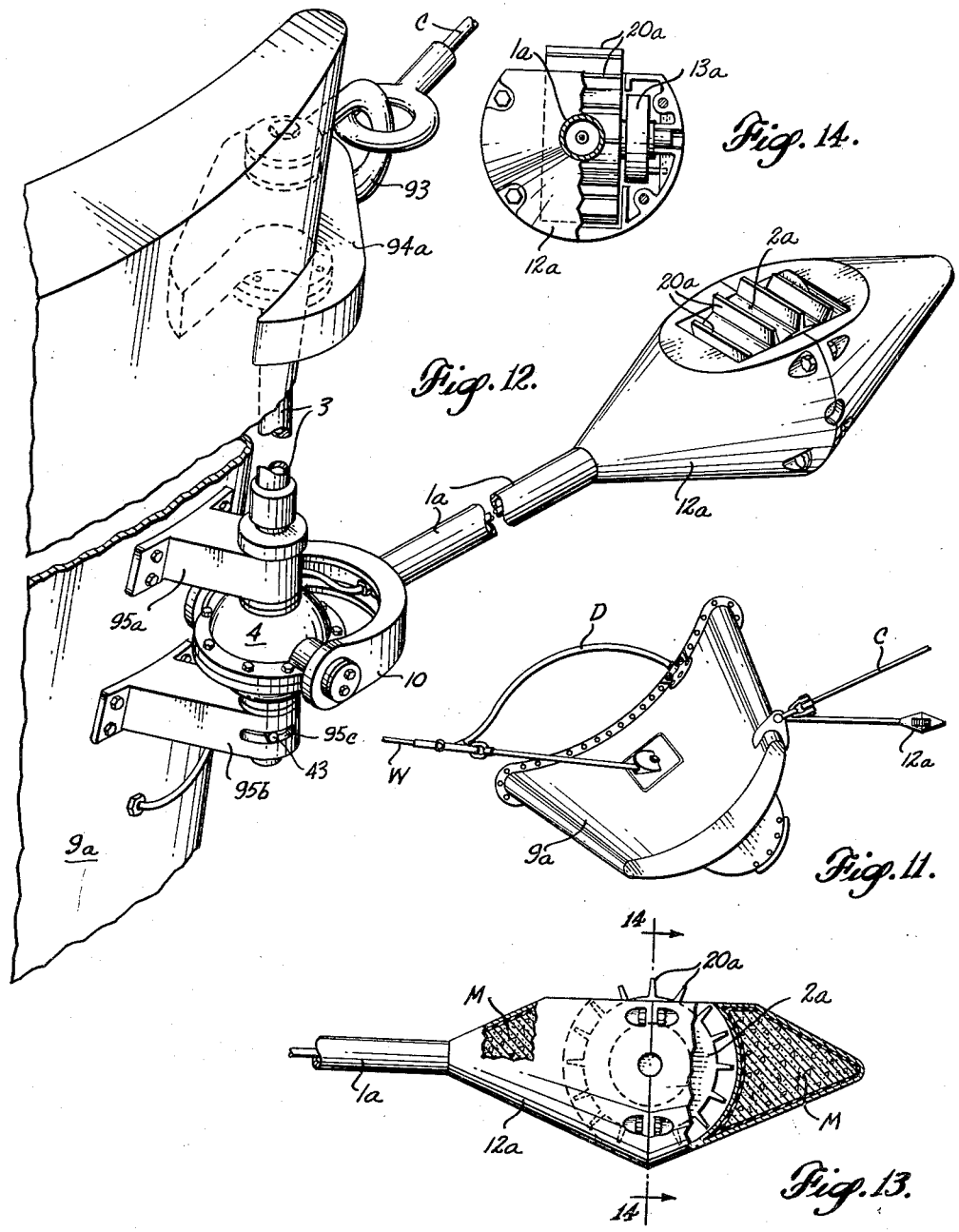

3,038,273
SPREAD, SPEED, DISTANCE, AND ON-BOTTOM SENSER FOR TRAWL NETS
Frank J. Luketa, 5567 Greenwood Ave., Seattle 3, Wash.
Filed Nov. 28, 1960, Ser. No. 72,089
15 Claims. (Cl. 43—9)

In trawling operations several related conditions should be observed and maintained in order to produce a maximum catch in the shortest time. For one, the curtains or wings of the net should be spread widely, since the wider they spread the greater, usually, is the area swept, and in general the more fish are caught. The distance the net travels, and the speed at which it travels, are factors which also bear on the area swept, for if the net travels a lesser distance with a given spread than at another time with the same spread, obviously the area swept in the first instance is less than the area swept in the second instance. The speed of the net relative to the water through which it is dragged affects the spread of the net, hence both spread, speed and distance must be known to determine the area swept, for the relative speed of net and water is not always consonant with the surface speed of the trawler, due to tide and current conditions at the depth of the net and at the surface, respectively. In bottom trawling one other factor is important, namely, whether or not the net is on bottom or is still sinking, or perhaps is pulled off the bottom by too short a towing warp. Unless a bottom trawl net is on bottom the bottom fish which it should catch can lie on the bottom as the net passes over them. It is therefore necessary to know when the net (or the doors that precede it) is on bottom, or is not.

The device of this invention, hereinafter for brevity termed "apparatus of the character described," enables the measurement or determination of these related conditions. More particularly it enables the measurement of the angle of the net's curtains (including in this term the wings of standard nets) relative to the direction of advance, the measurement of distance traveled and the speed of advance, and it affords a positive indication that a bottom trawl net is on the bottom. Such angle being known, and the length of the curtain, a simple geometrical calculation of a right triangle gives the sweep or spread of the net, and indeed, the reading instead of being in angular units may be in linear units of spread. The distance and speed may be determined with relation to the bottom, in the case of a bottom trawl net, or with relation to the ambient water, in the case of a midwater trawl net.

In somewhat greater detail, according to this invention a trailing device is carried by each door, the door being located ahead of the two curtains of the net, which device is maintained trailing at all times in line with the direction of advance. A curtain line or other similar line is connected to the door, and trails aft, but is directed laterally as well by the drag of the net connected to the divergent doors. Its angle relative to the direction of advance is a measure of the angle of spread of the corresponding curtain, so by interconnecting the relatively angularly movable trailing device and the curtain line's anchorage at the door to read the angle between them, the spread angle is ascertained directly. Knowing the length of the curtain, the right triangle can be solved, and its spread ascertained, this being one side of the right triangle. Multiplying this lateral distance by two gives the total distance between, or the total spread of the net's curtains or wings.

The trailing device may also serve, by contact with the bottom or by water reaction in midwater trawling, to measure distance advanced in a given time, wherefrom speed of the net is also ascertained.

This device also serves as an on-bottom senser to enable the skipper to positively know at all times when the doors, and therefore the trailing net (in bottom trawling), are on the bottom and consequently functional.

Incorporated, therefore, in this single rugged and relatively compact device are four sensers: speed, spread, distance and on-bottom, all of which are very useful in efficient trawling.

In addition to the general objects thus outlined, the present invention has a number of particular objects, which can best be understood as this specification progresses.

The accompanying drawings show the invention in representative forms, one for bottom trawling and one for midwater trawling.

FIGURE 1 is a plan view to a small scale, of a door and the trailing sensing device.

FIGURE 2 is an isometric view of the angle-measuring elements and their mounting upon a door, with the trailing device arranged for bottom contact.

FIGURE 3 is an enlarged isometric view, in section, of the interior of the angle-measuring device.

FIGURE 4 is an axial sectional view through the angle-measuring device.

FIGURE 5 is a plan-sectional view, at the line 5—5 of FIGURE 4, including the bottom contacting trailing lever.

FIGURE 6 is a part-elevational and part-sectional view, at the line 6—6 of FIGURE 5.

FIGURE 7 is a detail sectional view at the line 7—7 of FIGURE 6.

FIGURE 8 is a part-sectional view at the line 8—8 of FIGURES 3 and 4, and in part a plan view, at the same line.

FIGURE 9 is an elevational view of a bottom trawling operation, illustrating in particular the relation of the door, the curtain and sweep lines, and the sensing device.

FIGURE 10 is a plan diagram of the same, illustrating the geometry of the arrangement.

FIGURE 11 is a top plan view of a door in operation, similar to FIGURE 1, but illustrating the use of the invention in a midwater door.

FIGURE 12 is an isometric view similar to FIGURE 2, illustrating use in midwater trawling also.

FIGURE 13 is a broken-away side elevation of the trailing device, arranged for measurement of speed and distance in midwater trawling, and FIGURE 14 is a part-elevation and part-section of the same, at the line 14—14 of FIGURE 13.

The door shown in FIGURES 11 and 12 is of a type shown in my copending application entitled "Midwater Trawl Door and Method," Serial No. 63,025, filed October 17, 1960, and is intended for midwater trawling.

The door shown in FIGURES 1, 9 and 10 is of a type like that shown in my copending application entitled "Multisection Trawl Door Construction," Serial No. 52,140, filed August 26, 1960, and is intended for bottom trawling. In general it includes a hydrofoil hollow body 9, flow-controlling vanes 90 mounted on brackets 96, a bridle 91 at its opposite or forward face, to which a towing warp W running aft from the trawler T (FIGURES 9 and 10) is anchored at a single point 92, and an anchorage at 93, at its after face, for a curtain line C. The curtain line is of known length (L in FIGURE 10), and extends aft and inwardly from the outswept door to a connection near the center of the net's entrance. A sweep line B is also anchored to the door and connects to the net N near its entrance, but this sweep line is not utilized as part of the present invention (though it might be used instead of the curtain line C), and can be disregarded. It may be pointed out here that the anchorage 93 for the curtain line is at the end of a lever 94 which swings through a slight arc in the fore and aft direction under the influence of changes in the drag of the net as it loads with fish, to sense such changes. This movement, although slight, must be taken into account in the use of this anchorage for the purposes of the present invention.

The anchorage 93, in effect, is fixed to the upper end of two vertically aligned shafts 3 and 31, to the lower one of which is fixed a trailing device, including lever 1 and measuring wheel 2, which, in the trawling operation, always extend in the line of advance. The upper and lower parts of the shaft are relatively rotatable, as the spread angle varies, and this rotation can be measured in angular units. The anchorage 93 is shown in the form of a shackle that straddles the swinging end of lever 94, and is pivotable relative thereto, and that is affixed to a stiff but somewhat flexible nylon shaft 3. One end of the shackle 93 is clamped between a cap 93a and a disk 93b, both nonrotatable relative to lever 94, by a bolt 93c (see FIGURE 4). The other end of the shackle is clamped between the cap 93d (which serves also as the nut of the bolt 93c) and a disk 93e. The latter shackle end is flanged and bolted, or otherwise secured, to the upper end of the flexible upper nylon shaft 3, which in turn is splined at 30 to an aligned stub shaft 31, journaled within a sleeve 40 of a two-part hollow, spherical housing 4. This stub shaft 31 has a ring gear 32 clamped to it, within the housing 4. The ring gear 32 therefore rotates slightly as the shackle 93 pivots or swings relative to lever 94.

The housing 4 is journaled in two mounting lugs 95a and 95b carried by the door. The lever 1 carries a yoke 10 at its end opposite the wheel 2, by means of which it is enabled to rock about a transverse axis at 11 relative to the housing 4, and in addition any lateral swinging of the lever 1 swings the housing about its vertical axis in the mounting lugs 95a, 95b. A disk 41 is pinned within the housing 4 to rotate with the latter, and this disk supports a bracket 42. A gear train 33 connects the ring gear 32 and a spindle 34, a five-to-one speed-up being indicated, wherefore any angular movement of lever 1 relative to anchorage 93, or vice versa, effects rotation of spindle 34. A wiper arm 35 fixed upon spindle 34 is thereby moved along a circularly arranged rheostat 36, and by these or other suitable means the angle A (FIGURE 10) is indicated aboard the trawler T, electrical cable means D being the interconnection between the sensing means at the door and indicating means (not shown) aboard the trawler T. The indication may be in angular units, but since the length L of the curtain is known, and the spread S is readily ascertained as a function of these known quantities, the indication can be in linear units of spread if desired.

Excessive lateral swinging of the lever 1 can be prevented by a pin 43 projecting laterally from the housing 4 or some element rotatable therewith, within an arcuate slot 95c of a mounting lug 95b.

Proceeding now to the distance and the speed measuring functions of the wheel 2, the latter is shown in FIGURES 2, 5, 9 and 10 arranged for bottom contact, having tough rubber sheep's-foot lugs 20 outstanding from its periphery. An axle 21 is keyed to a rubber bushing 22 and the latter is keyed to the wheel hub, all being journaled in yoke 12. Rotation of the whel is communicated to a sensing device or revolution counter within a casing 13, a connection at 21a from the axle extending within the casing. The revolution counter or senser at 13 communicates the sensed number of revolutions, either in absolute units of distance, or in speed units, as in a speedometer, or both, by way of electric cable 22, and eventually cable D, to an indicator (not shown) aboard the trawler T.

It is desirable to know with certainty when the wheel 2 is in contact with the bottom, and the wheel must be maintained in a vertical plane, despite inclination of the door to one side or the other, for otherwise lateral deflection of the lever 1 may occur and the angle sensing would be inaccurate for determining spread. An "on-bottom" switch is mounted within the housing 5, carried by the yoke 10, and an exterior arm 51 is pivoted in the housing, and by its swinging makes or breaks contact at the switch. If the door is not on the bottom the lever 1, weighted by the wheel 2 and also urged by the spring E, will hang down as far as contact of stop 14 on lever 1 with stop 46 on housing 4 will permit. A cam roller 52 on the arm 51 is positioned where it can engage cam 45 on the housing 4, but when the lever 1 rests upon the stop 14 the roller 52 is below the lower terminus of cam 45, and does not engage the latter, although urged upwardly by clock spring 53 (FIGURE 6). When the door 9 is on the bottom the lever 1 is tilted upwardly, arm 51 is depressed by cam 45, and the circuit of the "on-bottom" switch is closed, actuating an indicator aboard the trawler T.

Uprightness of the wheel 2 is effected by making the lever 1 of two parts, the inner part 15 fixed to the yoke 10 journaling the outer part 16 for restricted (as determined by cap R) rotation about an axis extending lengthwise of the lever. The wheel 2, despite any tilt of the door 9, will now remain upright and track in the direction of advance, insuring that the lever 1 extends in the direction of advance. The sheep's-foot lugs insure against lateral flutter induced by the wake of the door.

The arrangement shown in FIGURES 12 to 14 is like that previously described, except it is used in midwater trawling, and there can be no contact of a wheel with the bottom. Instead the wheel 2a at the end of lever 1a is shrouded by a streamlined shroud 12a, except for a portion of its periphery. This portion is exposed to water through which it moves, and paddles 20a effect rotation of the wheel, which is journaled in the shroud 12a. Rotation of the wheel is at a rate corresponding to the speed at which it advances, and a revolution counter 13a serves the same purpose as in the form first described.

The rubber coated, resin bound wood flake moulding M encased in the shroud 12a gives the lever and wheel assembly a neutral buoyancy to insure maximum accuracy in speed, distance and spread sensing for the device.

The door 9a is of somewhat different form from the bottom trawl door 9, adapting it to midwater trawling. The anchorage at 93 need not be to a movable lever such as 94, but is shown as secured to a fixed lug 94a fixed to the door 9a. In other respects the invention in this form is like the form already described except that the on-bottom switch would be omitted.

To explain the operation of such indicator, the door is released from the trawler and sinks to the bottom, or in the case of the midwater operation, to its proper depth. The net of course sinks with it and trails behind it, imposing a drag on the anchorage 93, since the door is pulled ahead by the towing warp W. By water reaction the doors diverge outwardly and spread the net curtains. Eventually the inward pull of the towing warps and the net, and the outward force of the doors, balance one another, and the curtain line C (or another line such as the sweep line B) assumes a definite angle relative to the direction of advance. The lever 1 by now has aligned itself in the direction of advance and the angle A, calibrated in feet of spread, (FIGURE 10) is read at the indicator aboard the trawler directly from the relative movement of wiper arm 35 over rheostat 36, produced by the gear train 32, 33. The wheel 2, or 2a, is rotating in accordance with the rate or speed of advance, and indicates this through the mechanism within casing 13, or at 13a. It also indicates distance traveled.

Some of the contributions to the art of efficient trawling that the present invention offers are as follows:

(1) In bottom trawling, when fish have been located, usually after a period of prospecting in several areas by trial tows with the net, it is standard procedure to harvest the fish by first marking the starting point of the tow with an anchored buoy or a loran reading, and then tow a certain course from this point for anywhere from a half hour up to several hours (depending on the conditions in the area). Then "pick up" the trawl and return to the starting point and tow again as before. This is repeated until the "spot" has been "cleaned up" or the vessel is completely loaded. However, the fish are usually much more heavily concentrated in some area along the towing course and it would be, of course, much more productive to work only this area with shorter, more frequent tows. By the utilization of the load sensing device represented by lever 94, and fully disclosed in my copending application entitled "Trawl Net Load Responsive Trawling Method and Apparatus," Serial No. 52,141, filed August 26, 1960, coupled with the distance senser of the present invention, it is possible to precisely locate the area of highest density of fish and therefore greatly increase productivity.

(2) It is quite feasible to feed the sensed information, that the subject device gathers while trawling, into an electronic computer that controls a servo equipped engine throttle to the end that at all times, under any current and/or weather conditions, the optimum or maximum square feet of bottom area are covered per unit of time for a given trawler with a given set of conditions, and, consequently, the maximum catch of fish also.

(3) In midwater trawling as disclosed in my above mentioned copending application entitled "Midwater Trawl Door and Method," one technique used is to tow the trawl continuously while proceeding from one shoal of fish to the next in an area with many dispersed bodies of fish. The trawler changes course frequently and it is most useful to know when the net is again trailing directly aft of the vessel after a turn is made so that the lateral or horizontal positioning of the net is correct for the interception of the next shoal. When the spread angles sensed on each door by the subject device are equal again, after a change of course has been made, the net should normally then be trailing directly aft. Then the skipper of the trawler by steering the vessel directly over the shoal, as determined by sonar or asdic, is assured that the trailing net will intercept the fish providing, of course, that the net is at the same depth level as the fish. This problem of precise vertical positioning of the net is fully met in my copending "Midwater Trawl Door and Method" disclosure.

I claim as my invention:

1. Apparatus of the character described, comprising in combination with a door to be towed and arranged for attachment to the forward end of a trawl net's curtain to spread the same, comprising an anchorage pivotally mounted upon the door to swing about a vertical axis, and arranged for engagement by a tensioned line that extends in alignment with the curtain, a trailing lever also pivotally mounted upon the door to swing about a vertical axis, means at the trailing end of said lever to maintain it trailing in the line of advance, distance measuring means at the trailing end of said lever, and means interconnecting the pivotally mounted end of said lever and the pivotally mounted anchorage, to measure the relative angle therebetween when in operation, as a measure of the spread angle of the curtain.

2. Apparatus as in claim 1, including means mounting said lever for further pivotal movement about an axis directed transversely of the direction of advance, and means operatively connected to said lever and actuated by its pivotal movement about such transverse axis, as its trailing end contacts the bottom, to indicate such "on-bottom" condition.

3. Apparatus of the character described including a device to indicate the spread of a trawl net's curtain, comprising in combination with a door to be towed and intended for attachment to the forward end of a curtain to spread the same, an anchorage pivotally mounted by a vertical axis upon the door, to engage a tensioned line extending in alignment with the curtain, a trailing device also mounted by a vertical axis upon the door, and including an element formed and mounted to trail aft in the direction of advance during towing, means interconnecting said anchorage and said trailing device and incorporating two elements, one connected to the anchorage to swing therewith and the other connected to the trailing device to swing therewith, and said two elements being thereby relatively angularly movable, as a measure of the included angle between the direction of advance and the spread angle of the curtain.

4. Apparatus as in claim 3, including a rotative device carried by said trailing device and including means whereby it is rotatable at a rate corresponding to the rate of advance.

5. Apparatus as in claim 3, for use in bottom trawling, said trailing device being additionally mounted for rotative movement about an axis transverse to the direction of advance, and weighted at its after end to incline downwardly, and sensing means operatively connected to said trailing device and actuated by raising of its trailing after end upon bottom contact, to indicate the latter.

6. A device to indicate the spread of a trawl net's curtains, comprising, in combination with a towed door for attachment to the forward end of a curtain to spread the same, an anchorage pivotally mounted by a vertical axis upon the door for a tensioned line extending in alignment with the curtain, a member mounted upon the door for pivotal movement upon the same axis and formed to trail in the direction of advance during trawling, means operatively connected to each of said anchorage means and said member for relative movement in accordance with the relative angular movement of the anchorage means and the member, respectively, and sensing means arranged for actuation by such relative angular movement, whereby an indication of the included angle can be given.

7. A device to indicate the spread of a trawl net's curtains, comprising, in combination with a towed door which in use is attached to the forward end of a curtain to spread the same, two members pivotally mounted upon the door upon a common vertical axis, for independent angular movement about such axis, an anchorage secured to one such member for securement to the forward end of a curtain, to extend in alignment with the curtain as the later is tensioned in use, a lever mounted by the other member and arranged to trail in the direction of advance during use, and two cooperating sensing means connected respectively to and movable with the said two members, to sense the included angle between the same, as determined by the angle of the curtain relative to the direction of advance.

8. A device to indicate the distance advanced by a trawl door, comprising in combination with a pivotal mount disposed with its axis upright upon the door, a lever carried by said pivot mount and trailing aft therefrom, and swingable laterally therewith, rotatable means at the trailing end of said lever for engagement by a medium relative to which the door is advancing, and rotatable by such engagement, and sensing means operatively connected to said rotatable means to determine the speed of advance.

9. A device to indicate when a trawl door is on bottom, comprising in combination with a pivotal mount disposed with its axis upright upon the door, a lever pivotally mounted upon said pivotal mount to swing about a transverse axis and weighted at its after end to incline downwardly, and sensing means actuated by upward movement of said lever when its after end engages the bottom, to indicate that condition.

10. In an apparatus of the character described, in combination with a door to be towed and arranged for attachment to the forward end of a trawl net's curtain to spread the same, an anchorage pivotally mounted upon the door to swing about a vertical axis, and arranged for attachment to the forward end of a trawl net's curtain, a shaft fixed to and pivotally swingable with said anchorage, a lever and means at its one end for pivotally mounting said lever upon the door coaxially with said shaft, to swing laterally at its opposite end, means at such opposite end to maintain the lever trailing in the direction of advance, two cooperating sensing elements, one connected to and swingable with said shaft, and the other connected to and swingable with the lever, to sense the included angle between the curtain attached at said anchorage and the lever which trails in the direction of advance.

11. In an apparatus of the character described, in combination with a door to be towed, arranged for attachment to the forward end of a trawl net's curtain to spread the latter, an anchorage pivotally mounted upon the door to swing about a vertical axis, and arranged for attachment to the forward end of such a curtain, a shaft fixed to and pivotally movable with said anchorage, a housing pivotally mounted upon the door to swing coaxially with said shaft, a trailing device secured to said housing and trailing thence aft, means at its after end to maintain said device trailing in the direction of advance, two cooperating sensing elements within said housing, one being connected to and pivotable with said trailing device, to sense the included angle between the curtain attached at said anchorage, and the trailing device aligned with the direction of advance.

12. In an apparatus as defined in claim 11, wherein the anchorage is movable within narrow limits relative to the door, and the housing is fixedly pivoted, said shaft including a limitedly flexible portion intermediate the anchorage and the sensing element which is connected for pivotal movement with the anchorage.

13. In an apparatus of the character described, in combination with a door to be towed, arranged for attachment to the forward end of a trawl net's curtain to spread the later, a lever pivotally mounted by one end on the door to swing laterally about an upright axis and vertically about a transverse axis, its opposite end being formed as a yoke, a wheel journaled in said yoke, and means operatively connected to said wheel to sense the revolutions of said wheel.

14. Apparatus of the character defined in claim 13, said lever being formed in two parts, said two parts being interconected for relative rotational movement about an axis directed lengthwise of the lever.

15. Apparatus of the character defined in claim 13, including additionally a mount whereon the lever is mounted for vertical swinging and itself swingable laterally with the lever, a cam fixed upon said mount, an arm pivotally mounted upon said lever and located to engage said cam when the trailing end of the lever is upswung, but to disengage the same when the lever is downswung, and sensing means operatively connected to said arm to sense its position about its pivot.

References Cited in the file of this patent

UNITED STATES PATENTS

| | | |
|---|---|---|
| 745,726 | Hathaway | Dec. 1, 1903 |
| 2,396,453 | Windle | Mar. 12, 1946 |
| 2,451,244 | Scott et al. | Oct. 12, 1948 |
| 2,681,568 | Cloud | June 22, 1954 |
| 2,729,910 | Fryklund | Jan. 10, 1956 |
| 2,765,565 | Mussio | Oct. 9, 1956 |
| 2,817,906 | Hall | Dec. 31, 1957 |